United States Patent
Damnjanovic

(10) Patent No.: US 8,670,394 B2
(45) Date of Patent: Mar. 11, 2014

(54) UPLINK REQUESTS

(75) Inventor: Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1266 days.

(21) Appl. No.: 12/186,708

(22) Filed: Aug. 6, 2008

(65) Prior Publication Data

US 2009/0046642 A1    Feb. 19, 2009

Related U.S. Application Data

(60) Provisional application No. 60/955,845, filed on Aug. 14, 2007.

(51) Int. Cl.
*H04W 4/00*  (2009.01)

(52) U.S. Cl.
USPC .......................................... 370/329

(58) Field of Classification Search
None
See application file for complete search history.

(56) References Cited

U.S. PATENT DOCUMENTS

| | | | |
|---|---|---|---|
| 6,578,082 B1* | 6/2003 | Ho et al. .................... | 709/233 |
| 7,016,658 B2* | 3/2006 | Kim et al. .................. | 455/102 |
| 7,668,170 B2* | 2/2010 | Deshpande ................. | 370/394 |
| 7,869,461 B2* | 1/2011 | Lohr et al. ................. | 370/469 |
| 2005/0047416 A1* | 3/2005 | Heo et al. .................. | 370/395.4 |
| 2007/0058548 A1* | 3/2007 | Babonneau et al. ....... | 370/235.1 |
| 2007/0201369 A1* | 8/2007 | Pedersen et al. ........... | 370/235 |
| 2008/0026738 A1* | 1/2008 | Jiang .......................... | 455/418 |
| 2008/0159135 A1* | 7/2008 | Caram ........................ | 370/230 |
| 2009/0168793 A1* | 7/2009 | Fox et al. .................. | 370/412 |

FOREIGN PATENT DOCUMENTS

| | | |
|---|---|---|
| EP | 1075116 | 2/2001 |
| EP | 1511245 | 3/2005 |
| RU | 2234192 C2 | 8/2004 |
| WO | 9845966 | 10/1998 |
| WO | WO0201763 A1 | 1/2002 |
| WO | 2007088465 | 8/2007 |

OTHER PUBLICATIONS

International Search Report—PCT/US08/073070, International Search Authority—European Patent Office, Feb. 2, 2009.
Written Opinion—PCT/US08/073070, International Search Authority—European Patent Office, Feb. 2, 2009.
Universal mobile telecommunications system (UMTS); medium access control (MAC) protocol specification (3GPP TS 25.321 version 7.5.0 Release 7); ETSI TS 125 321 v7.5.0 (Jun. 2007), pp. 76-116.
Taiwan Search Report—TW097131051—TIPO—Dec. 26, 2011.

\* cited by examiner

*Primary Examiner* — Rhonda Murphy
(74) *Attorney, Agent, or Firm* — Nerrie M. Zohn

(57) ABSTRACT

Systems and methodologies are described that facilitate generating uplink requests that account for bit rates of multiple radio bearers. In particular, one or more radio bearers serviced by a user equipment are assigned priorities. In addition, each radio bearer is assigned a prioritized bit rate and a maximum bit rate. The prioritized bit rates and maximum bit rates of at least one bearer are utilized to determine a high priority queue size and a total queue size. The queue sizes are incorporated into an uplink resource request transmitted to an access point.

29 Claims, 11 Drawing Sheets

UPLINK REQUESTS

CROSS-REFERENCE TO RELATED APPLICATIONS

This application claims the benefit of U.S. Provisional Patent application Ser. No. 60/955,845 entitled "METHOD AND APPARATUS FOR CREATING AN UPLINK REQUEST MESSAGE" which was filed Aug. 14, 2007. The entirety of the aforementioned application is herein incorporated by reference.

BACKGROUND

I. Field

The following description relates generally to wireless communications, and more particularly to uplink resource request formats in wireless communications networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with employing uplink requests that account for bit rates of multiple radio bearers. In particular, one or more radio bearers serviced by user equipment are assigned priorities. In addition, each radio bearer is assigned a prioritized bit rate and a maximum bit rate. The prioritized bit rates and maximum bit rates of at least one bearer are utilized to determine a high priority queue size and a total queue size. The queue sizes are incorporated into an uplink resource request transmitted to an access point.

According to related aspects, a method that facilitates uplink rate control in a wireless communications system is provided. The method can comprise assigning prioritized bit rates and maximum bit rates to one or more radio bearers serviced by a user equipment. The method can also include determining a high priority queue size based at least in part on the prioritized bit rates of the one or more radio bearers. In addition, the method can include determining a total queue size based at least in part on the prioritized bit rates and the maximum bit rates of the one or more radio bearers. The method can additionally comprise transmitting an uplink resource request that includes the high priority queue size and the total queue size.

Another aspect relates to a wireless communications apparatus. The wireless communications apparatus can include a memory that retains instructions related to assigning prioritized bit rates and maximum bit rates to one or more radio bearers serviced by a user equipment, determining a high priority queue size based at least in part on the prioritized bit rates of the one or more radio bearers, determining a total queue size based at least in part on the prioritized bit rates and the maximum bit rates of the one or more radio bearers and transmitting an uplink resource request that includes the high priority queue size and the total queue size. In addition, the wireless communications apparatus can also include a processor, coupled to the memory, configured to execute the instructions retained in the memory.

Yet another aspect relates to a wireless communications apparatus that facilitates uplink rate control in a wireless communications system. The wireless communications apparatus can comprise means for assigning prioritized bit rates and maximum bit rates to one or more radio bearers serviced by a user equipment. The wireless communications apparatus can further include means for determining a high priority queue size based at least in part on the prioritized bit rates of the one or more radio bearers. In addition, the wireless communications apparatus can also include means for determining a total queue size based at least in part on the prioritized bit rates and the maximum bit rates of the one or more radio bearers. The wireless communications apparatus can additionally comprise means for transmitting an uplink resource request that includes the high priority queue size and the total queue size.

Still another aspect relates to a computer program product, which can have a computer-readable medium include code for causing at least one computer to assign prioritized bit rates and maximum bit rates to one or more radio bearers serviced by a user equipment. The computer-readable medium can also comprise code for causing at least one computer to determine a high priority queue size based at least in part on the prioritized bit rates of the one or more radio bearers. In addition, the computer-readable medium can include code for causing at least one computer to determine a total queue size based at least in part on the prioritized bit rates and the maximum bit rates of the one or more radio bearers. The computer-readable medium can also include code for causing at least one computer to transmit an uplink resource request that includes the high priority queue size and the total queue size.

Still yet another aspect relates to an apparatus in a wireless communications system. The apparatus can comprise a processor configured to assign prioritized bit rates and maximum bit rates to one or more radio bearers serviced by a user equipment. The processor can be further configured to determine a high priority queue size based at least in part on the prioritized bit rates of the one or more radio bearers and determine a total queue size based at least in part on the prioritized bit rates and the maximum bit rates of the one or more radio bearers. In addition, the processor can be configured to transmit an uplink resource request that includes the high priority queue size and the total queue size.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
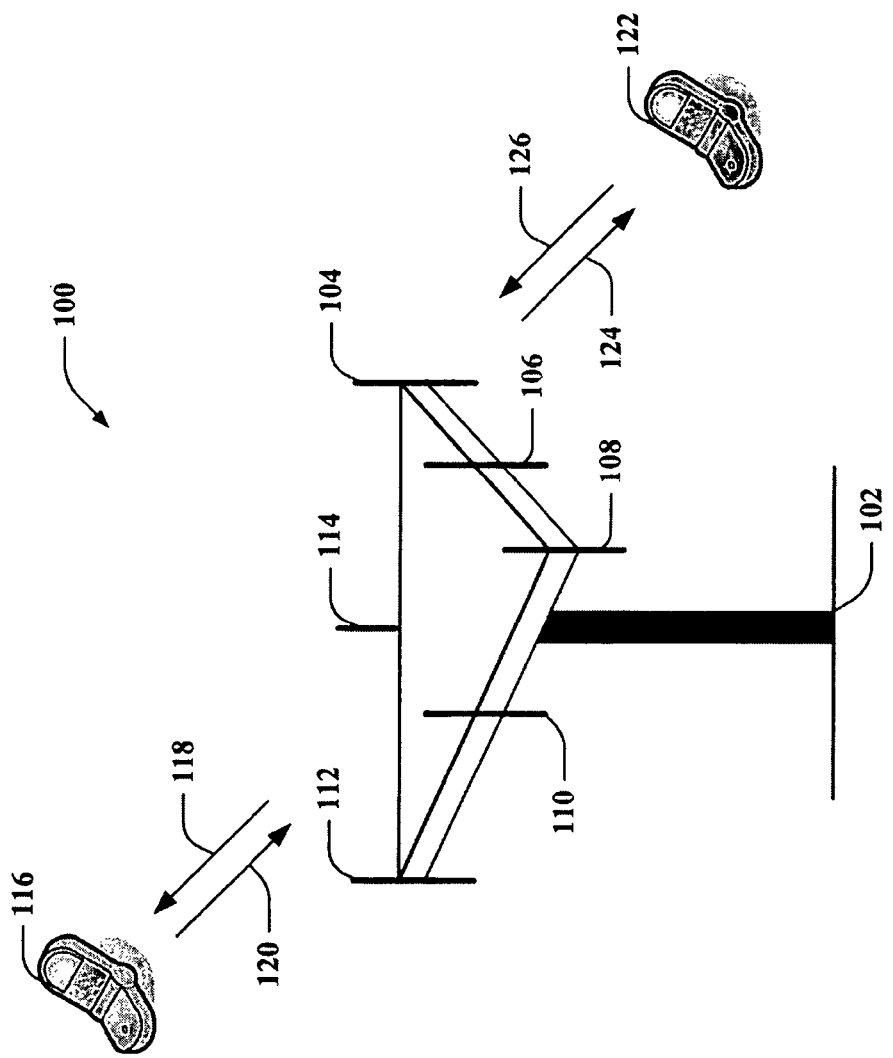
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g. compact disk (CD), digital versatile disk (DVD), etc.), smart cards, and flash memory devices (e.g. EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize substantially any type of duplexing technique to divide communication channels (e.g. forward link, reverse link, . . . ) such as FDD, TDD, and the like. Moreover, the system 100 can be a multiple-bearer system. A bearer can be an information path of defined capacity, delay, bit error rate, etc. Mobile devices 116 and 122 can each serve one or more radio bearers. The mobile devices 116 and 122 can employ uplink rate control mechanisms to manage and/or share uplink resources across the one or more radio bearers. In one example, the mobile devices 116 and 122 can utilize token bucket mechanisms to serve the radio bearers and to enforce uplink rate limitations.

Pursuant to an illustration, each bearer can have an associated prioritized bit rate (PBR), maximum bit rate (MBR) and guaranteed bit rate (GBR). The mobile devices 116 and 122 can serve the radio bearers based, at least in part, on the associated bit rate values. The bit rate values can also be employed to calculate queue sizes that account for PBR and MBR for each bearer. The queue sizes can be included in uplink resource requests transmitted by the mobile devices 116 and 122 to the base station 102. The base station 102 can schedule uplink resources for mobile device 116 and 122 based upon respective uplink requests and included queue sizes.

Figure 2:
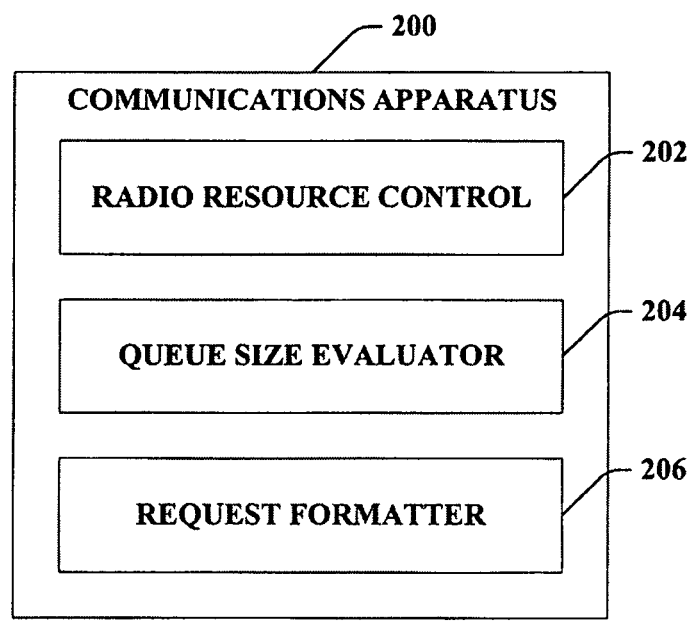
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In particular, the communications apparatus 200 can be an access point that provides wireless communication services to a requesting device. The communications apparatus 200 can include a radio resource control 202 that can assign each radio bearer a prioritized bit rate (PBR), a maximum bit rate (MBR) and a guaranteed bit rate (GBR), a queue size evaluator 204 that can calculate queue sizes based at least in part on the PBRs and MBRs of one or more radio bearers, and a request formatter 206 that can generate an uplink resource request packet that includes the calculated queue sizes.

Pursuant to an example, the communications apparatus 200 can serve one or more radio bearers. A bearer can be an information path that includes a defined capacity, delay, bit error rate, etc. For instance, a bearer can be a logical channel. The communications apparatus 200 can serve the one or more radio bearers in accordance with a priority. To ascertain priority, the radio resource control (RRC) 202 can assign each radio bearer serviced by the communications apparatus 200 a PBR, a MBR and a GBR. The RRC 202 is part of the UMTS WCDMA protocol stack and handles control plane signally between user equipments (e.g., mobile devices or access terminals) and a radio access network (e.g., base stations, access points, radio network controllers, etc.). The RRC 202 can handle functions such as connection establishment and release, broadcast of system information, radio bearer establishment, reconfiguration and release, RRC connection mobility procedures, paging notification and release, outer loop power control and the like.

With assigned bit rates to each radio bearer, the communications apparatus 200 can determine a queue size that accounts for PBRs and MBRs of the one or more radio bearers. The queue size evaluator 204 can ascertain an appropriate high priority queue size and a total queue size based, at least in part, on the bit rates (e.g., PBR and MBR) of radio bearers served by the communications apparatus 200. The queue size evaluator 204 can the high priority queue size (QS(h)) according to the following:

$$QS(h) = \min(TBD(PBR1), QS(1)) + \\ \min(TBD(PBR2), QS(2)) \ldots + \min(TBD(PBRn), QS(n)) + \\ \min(TBD(MBR1), QS(1)) - \min(TBD(PBR1), QS(1))$$

Pursuant to this example, QS(1) represents total queue size of bearer 1 (e.g., highest priority bearer), QS(2) represents total queue size of bearer 2 and QS(n) represents total queue size of bearer n, where n is an integer greater than or equal to one. TBD (e.g., a function name that represents total bucket depth) is a function that evaluates total bucket depth based upon a bit rate (e.g., prioritized or maximum) of a bearer. Accordingly, the high priority queue size, QS(h) corresponds to a sum of total queue sizes of all bearers limited by PBR token bucket depths and total queue size of the highest priority bearer limited by a MBR token bucket depth. Thus, QS(h) is the sum of all high priority data across all bearers (e.g., data in a bearer queue held in a prioritized bit rate token bucket). In addition, the remaining data of the highest priority bearer (e.g., bearer 1) is also considered and added to the sum.

It is to be appreciated that the queue size evaluator 204 need not be restricted to the example described above. For instance, the queue size evaluator 204 can determine high priority queue size, QS(h), to be the total queue size of the highest priority bearer limited by the PBR token bucket depth.

$$QS(h) = \min(TBD(PBR1), QS(1))$$

Pursuant to this illustration, the high priority queue size corresponds to the amount of high priority data of the first bearer.

Moreover, the queue size evaluator 204 can sum high priority data across all bearers and not consider remaining data of bearer 1.

$$QS(h) = \min(TBD(PBR1), QS(1)) + \min(TBD(PBR2), QS(2)) \ldots + \min(TBD(PBRn), QS(n))$$

Pursuant to another illustration, the high priority queue size can be determined according to the following:

$$QS(h) = \min(TBD(PBR1) + TBD(MBR1), QS(1))$$

In this example, the high priority queue size is the total queue size of the highest priority radio bearer (e.g., bearer 1) limited by the sum of PBR bucket depth and MBR bucket depth of the bearer.

The queue size evaluator 204 also ascertains a total queue size, QS(t), according to the following:

$$QS(t) = \min(TBD(PBR1) + TBD(MBR1), QS(1)) + \\ (TBD(PBR2) + TBD(MBR2), QS(2)) + \\ \ldots + (TBD(PBRn) + TBD(MBRn), QS(n))$$

Pursuant to this illustration, the total queue size, QS(t) denotes the total queue seize across all bearers (e.g., bearers 1 through n, where n is any integer greater than or equal to one). The total queue size across all bearers is limited by the PBR and MBR token bucket depths. The limitation prevents total queue size from exceeding the bit rate constraints. It is to be appreciated that the queue size evaluator 204 can employ other mechanisms. For example, the total queue size, QS(t) can be a simple sum of all queue sizes and a base station or network can impose MBR constraints.

Figure 5:
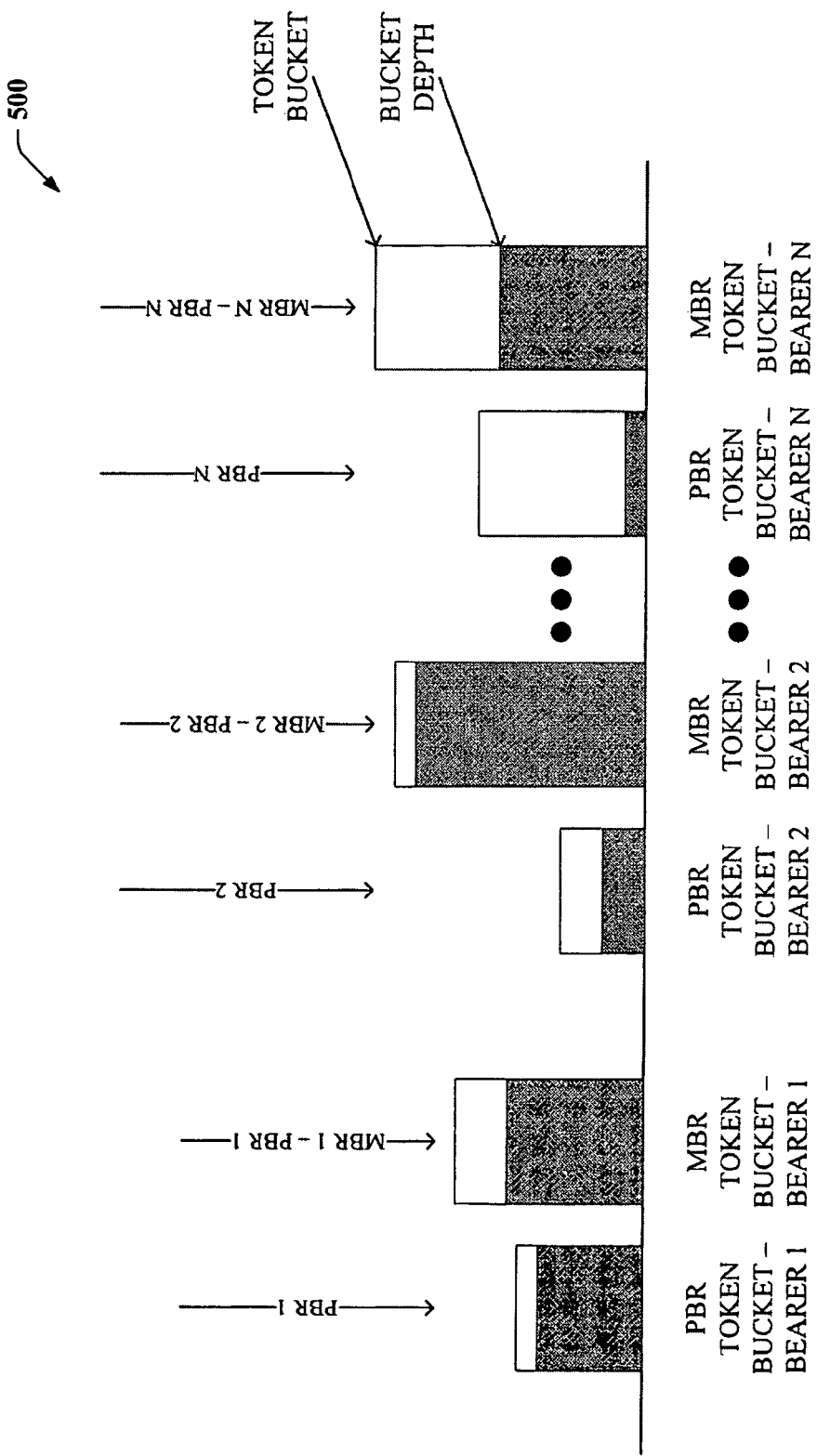
FIG. 5 is an illustration of an example system that depicts a token bucket mechanism.

Moreover, it is to be appreciated that the queue size evaluator 204 can employ similar principles where the communications apparatus 200 does not utilize a token bucket mechanism as described infra with regard to FIG. 5. For instance, The high priority queue size can correspond to an amount of data with a current priority higher or equal to priority of the highest priority flow that conforms to a maximum bit rate. In addition, the total queue size can correspond to a simple total queue size.

The request formatter 206 can generate an uplink resource request packet that includes the high priority queue size and the total queue size determined by the queue size evaluator 204. The communications apparatus can emit an uplink request upon changes in delay deadline and/or queue sizes. In some circumstances, the network (e.g., base stations, radio access network, etc.) limits frequency of requests. However, if the communications apparatus 200 does not have uplink resources (e.g., scheduled on PDSCH), the communications apparatus 200 can send out of band requests on a dedicated uplink request channel. The dedicated channel can include one or two bits that convey urgency for data to be scheduled.

Moreover, although not shown, it is to be appreciated that communications apparatus 200 can include memory that retains instructions with respect to assigning prioritized bit rates to radio bearers, assigning maximum bit rates to radio bearers, evaluating high priority queue sizes, determining total queue sizes, formatting requests, and the like. In addition, the memory can include instructions that implement a token bucket mechanism to enforce rate control. Further, communications apparatus 200 may include a processor that may be utilized in connection with executing instructions (e.g., instructions retained within memory, instructions obtained from a disparate source, . . . ).

Figure 3:
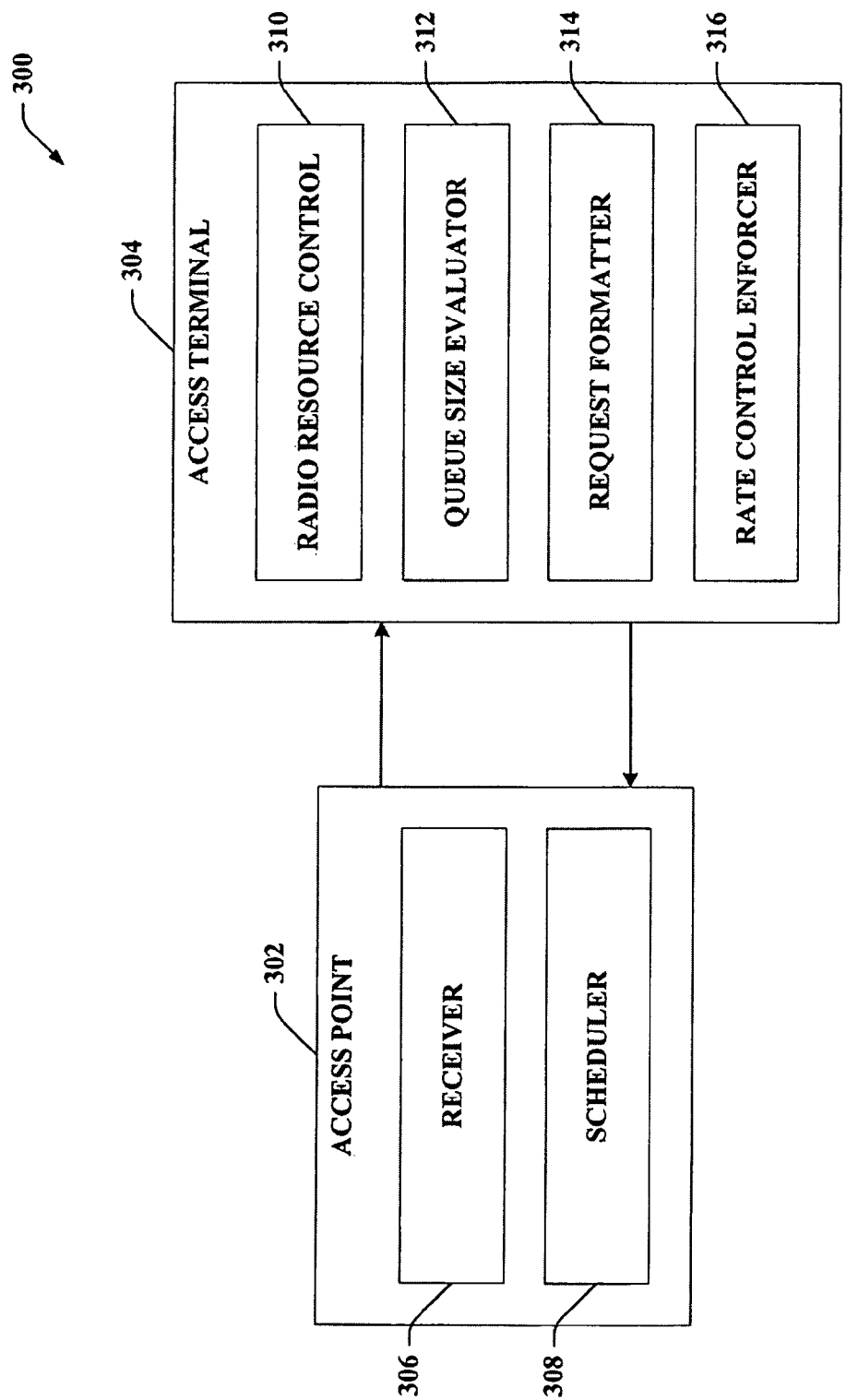
FIG. 3 is an illustration of an example wireless communications system that facilitate employing PBR and MBR values in determining queue sizes included in resource requests.

Now referring to FIG. 3, illustrated is a wireless communications system 300 that can facilitate employing PBR and MBR values in determining queue sizes included in resource requests. The system 300 includes an access point 302 that can communicate with an access terminal 304 (and/or any number of disparate devices (not shown)). The access point 302 can transmit information to the access terminal 304 over a forward link channel; further access point 302 can receive information from the access terminal 304 over a reverse link channel. Moreover, system 300 can be a MIMO system or a multiple bearer system where the access terminal 304 serves multiple radio bearers (e.g. logical channels). Additionally, the system 300 can operate in an OFDMA wireless network (such as 3GPP, 3GPP2, 3GPP LTE, etc., for example). Also, the components and functionalities shown and described below in the access point 302 can be present in the access terminal 304 and vice versa, in one example.

The access point 302 includes a receiver 305 that obtains uplink resource requests from the access terminal 304. The access point 302 can also include a scheduler 308 that schedules or assigns resources to the access terminal 304 in accordance with the request. The access terminal 304 can include a radio resource control (RRC) 310 that can assign a prioritized bit rate (PBR), a maximum bit rate (MBR) and a guaranteed bit rate (GBR) to each radio bearer serviced by the access terminal 304. The access terminal 304 can also include a queue size evaluator 312 that can calculate queue sizes for the access terminal 304 based at least in part on the PBRs and MBRs of one or more radio bearers. In addition, the access terminal can include a request formatter 314 that that can generate an uplink resource request packet that includes the calculated queue sizes. Moreover, the access terminal 304 can include a rate control enforcer 316 that can enforce PBR and MBR for each radio bearer and manage sharing of uplink resources amongst one or more radio bearers.

According to an example, the access terminal 304 can serve one or more radio bearers. The access terminal 304 can serve the one or more radio bearers in accordance with a priority. To ascertain priority, the radio resource control (RRC) 310 can assign each radio bearer a PBR, a MBR and a GBR. The queue size evaluator 312 can utilize the PBR and MBR assigned to each radio bearer to determine a high priority queue size (e.g., amount of high priority data) and a total queue size (e.g., amount of data). The queue size evaluator 312 can employ one of the mechanisms described above with reference to FIG. 2 to ascertain the high priority queue size and the total queue size.

The request formatter 314 can generate an uplink resource request packet that includes the high priority queue size and the total queue size determined by the queue size evaluator 312. The access terminal 304 can transmit a request upon changes in delay deadline and/or queue sizes. In some circumstances, the access point 302 limits frequency of requests. However, the access terminal 304 can utilize out-of-band requests transmitted on a dedicated uplink request channel if the access terminal 304 does not have uplink resources. The dedicated channel can include one or two bits that convey urgency for data to be scheduled. The request formatter 314 can utilize a variety of packet formats to generate the request.

Figure 4:
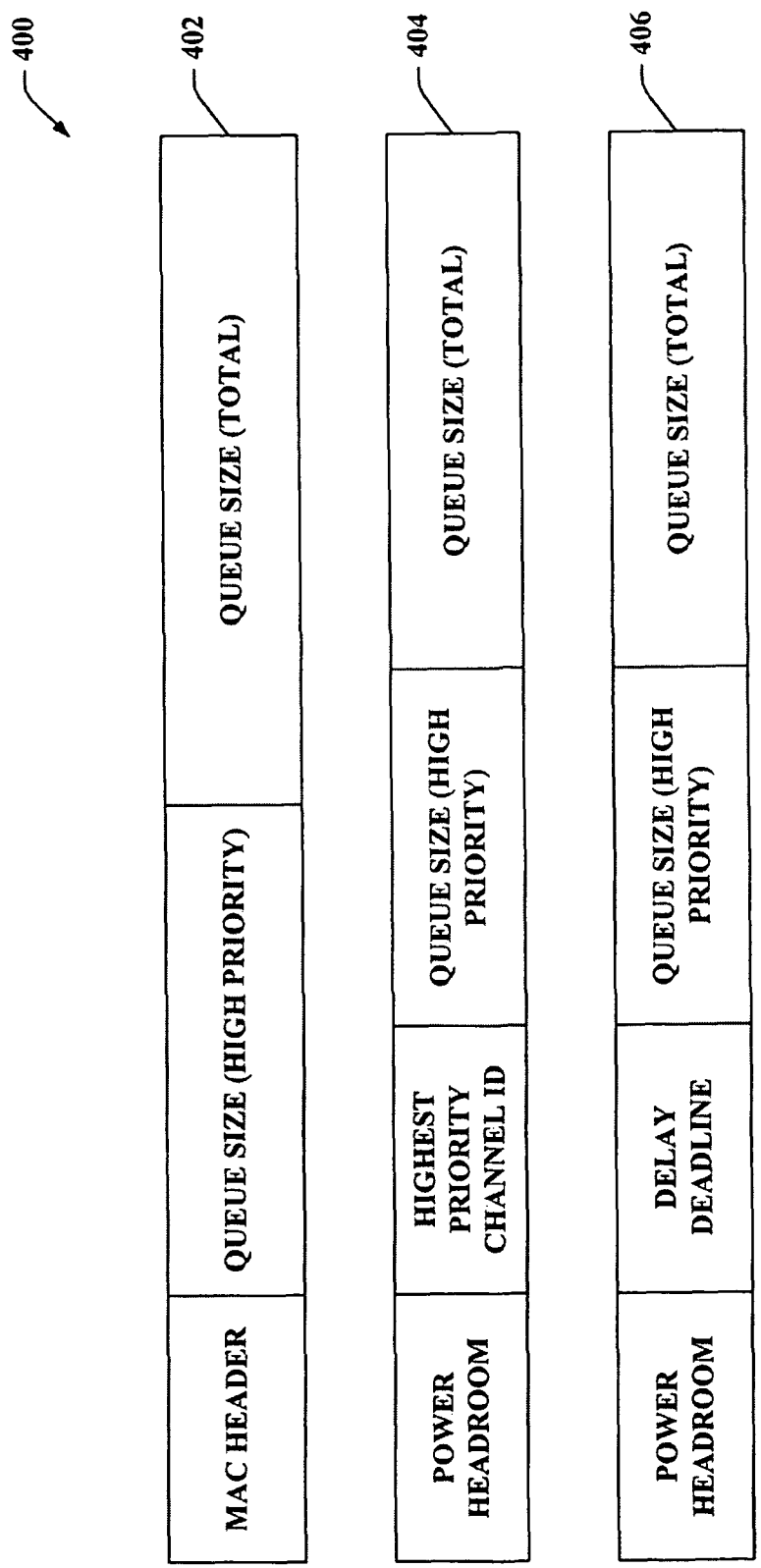
FIG. 4 is an illustration of example packet formats that can be utilized to request uplink resources.

Turning briefly to FIG. 4, example packet formats 400 that can be utilized to request uplink resources are depicted. The packet formats 400 can be similar to request formats utilized in high speed uplink packet access (HSUPA). However, queue size in the packet formats is computed in order to account for PBR and MBR of each flow as described above. Packet format 402 includes a medium access control (MAC) header, a queue size for high priority data and a total queue size for all data. The MAC header is a header that prefixes the packet 402 in order to construct a frame that is ready for transmission. The queue size for high priority data and total queue size can be the values determined by the queue size evaluator 204 or 312. Packet format 404 includes power headroom, a channel identifier of a highest priority channel or bearer, and the high priority queue size and total queue size. Power headroom relates to transmission power reserved in case additional transmission power is required. For example, power headroom is required to enable an access point (e.g., a base station, eNodeB, etc.) scheduler to assign appropriate modulation and coding schemes (MCS) for uplink transmissions so that HARQ terminates before a maximum number of transmissions is exhausted. The channel identifier relates to identity of a highest priority logical channel or bearer. Packet 406 is similar to packet format 404 except a delay deadline is included in place of a channel identifier. In this format, the high priority queue size denotes amount of data with a smallest time to deadline and delay deadline corresponds to this time to deadline.

Referring back to FIG. 3, the access terminal 304 can transmit the uplink request generated by the request formatter 314 to the access point 302. The receiver 306 can obtain the transmitted uplink request and provide it to the scheduler 308. The scheduler 308 assigns uplink resources to the access terminal 304 based at least in part on the queue sizes reported in the uplink request.

Once resources are obtained, the access terminal 304 can serve radio bearers. The rate control enforcer 316 prioritizes radio bearers to ensure resources are shared and the bit rate constraints (e.g., PBR, MBR . . . ) are observed. The rate control enforcer 316 serves radio bearers in decreasing priority order up to the PBR of the bearers. Thus, high priority data is served in order from highest amount to lowest amount so long as the PBR is not exceeded. Then, radio bearers are served in decreasing priority order for the remaining resources assigned by the resource grant conveyed by the scheduler 308. The rate control enforcer 316 serves radio bearers for the remaining resources so long as the MBR of the bearers are not exceeded. In some situations, all radio bearers can have PBRs set to zero. The radio bearers are served in strict priority order and the rate control enforcer 316 maximizes transmission of higher priority data. In addition, the rate control enforcer 316 equally serves radio bearers with the same priority.

The rate control enforcer 316 can employ a token bucket mechanism. Turning briefly to FIG. 5, an example system 500 is illustrated that depicts a token bucket mechanism. The system 500 illustrates multiple radio bearers ranked 1 through N where N is any integer greater than or equal to one. The bearer ranked 1 denotes the highest priority radio bearer. While three bearers are depicted, it to be appreciated any number of bearers greater than or equal to one can be utilized in connection with aspects of the subject disclosure. Each radio bearer has a PBR token bucket and a MBR token bucket. The PBR token bucket includes high priority data and the MBR token bucket includes remaining data. Total capacity of the token buckets is limited in accordance with PBR and MBR as assigned by the radio resource control. Each token bucket has an associated bucket depth that corresponds to amount of tokens or data in the bucket. When a mobile device (e.g., access terminal or user equipment) transmits data, the mobile device first consumes tokens or data from PBR token buckets, if available. If tokens are not available in PBR token buckets, the mobile device consumes tokens from MBR token buckets.

Figure 6:
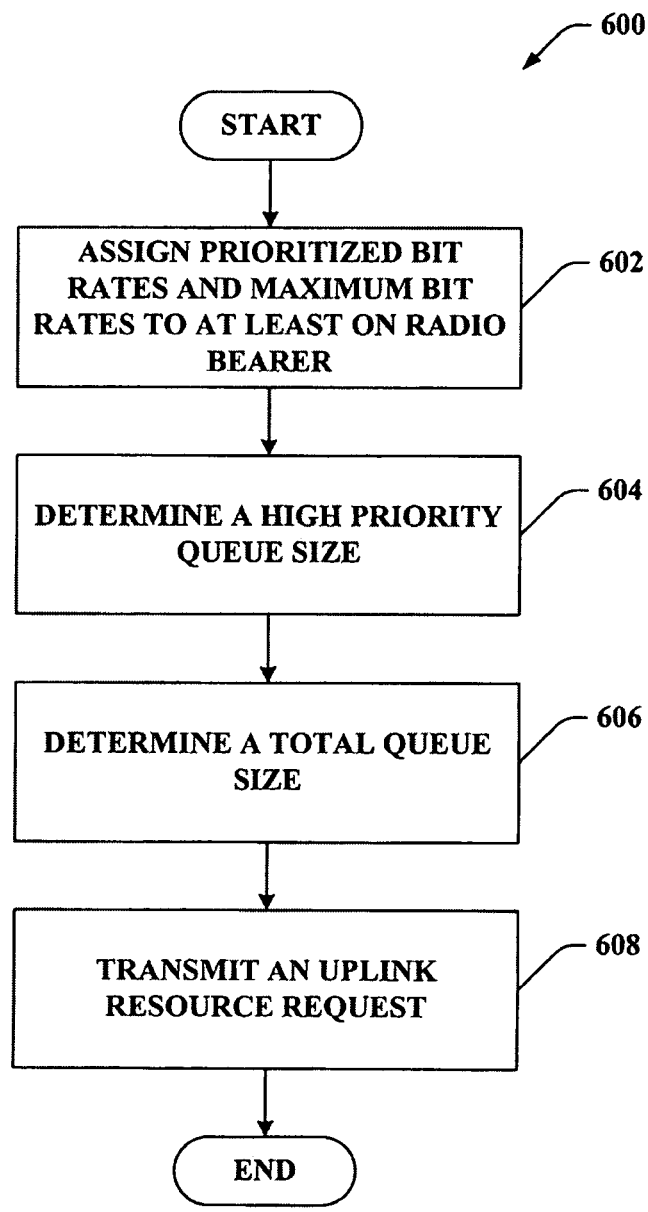
FIG. 6 is an illustration of an example methodology that facilitates accounting for prioritized and maximum bit rates in uplink requests in a wireless communications system.
Figure 7:
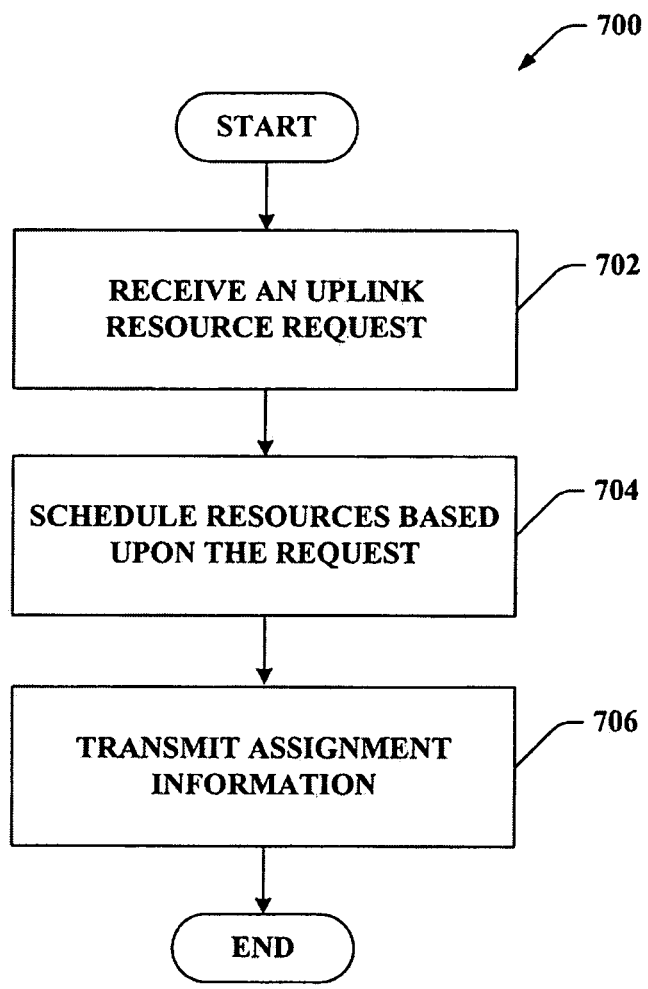
FIG. 7 is an illustration of an example methodology that facilitates scheduling resources in response to an uplink request that accounts for prioritized and maximum bit rates of bearers.

Referring to FIGS. 6-7, methodologies relating to generating uplink requests that include queue sizes accounting for PBR and MBR of multiple radio bearers. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 6, illustrated is a methodology 600 that facilitates accounting for prioritized and maximum bit rates in uplink requests in a wireless communications system. At reference numeral 602, prioritized bit rates and maximum bit rates are assigned to one or more radio bearers. Pursuant to an illustration, a radio bearer can be an information path that includes a defined capacity, delay, bit error rate, etc. For instance, a bearer can be a logical channel. At reference numeral 604, a high priority queue size is determined. For example, the high priority queue size can be based upon the prioritized bit rates of all radio bearers. According to an aspect, the high priority queue size corresponds to a sum of total queue sizes of all radio bearers wherein the total queue size of a particular bearer is limited to a prioritized bit rate token bucket depth of the particular bearer. At reference numeral 606, a total queue size is determined. In accordance with an example, the total queue size can be based on the prioritized bit rates and the maximum bit rates of all bearers. For instance, the total queue size can corresponds to a sum of total queue sizes of all radio bearers wherein the total queue size of a particular bearer is limited to a sum of prioritized bit rate token bucket depth of the particular bearer and the maximum bit rate token bucket depth of the particular bearer. At reference numeral 608, an uplink resource request is transmitted. The uplink resource request includes the high priority queue size and the total queue size determined with respect to the bit rates of all radio bearers.

Turning to FIG. 7, illustrated is a methodology 700 that facilitates scheduling resources in response to an uplink request that accounts for prioritized and maximum bit rates of bearers. At reference numeral 702, an uplink resource request is received from an access terminal. The uplink resource request includes a high priority queue size and a total queue size determined with respect to the bit rates of all radio bearers. At reference numeral 704, uplink resources are scheduled to the access terminal based at least in part on the queue sizes included in the uplink request. At reference numeral 706, assignment information that specifies the resources scheduled to the access terminal is transmitted to the terminal.

It will be appreciated that, in accordance with one or more aspects described herein, inferences can be made regarding assigning priorities to bearers and/or assigning bit rates to bearers. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
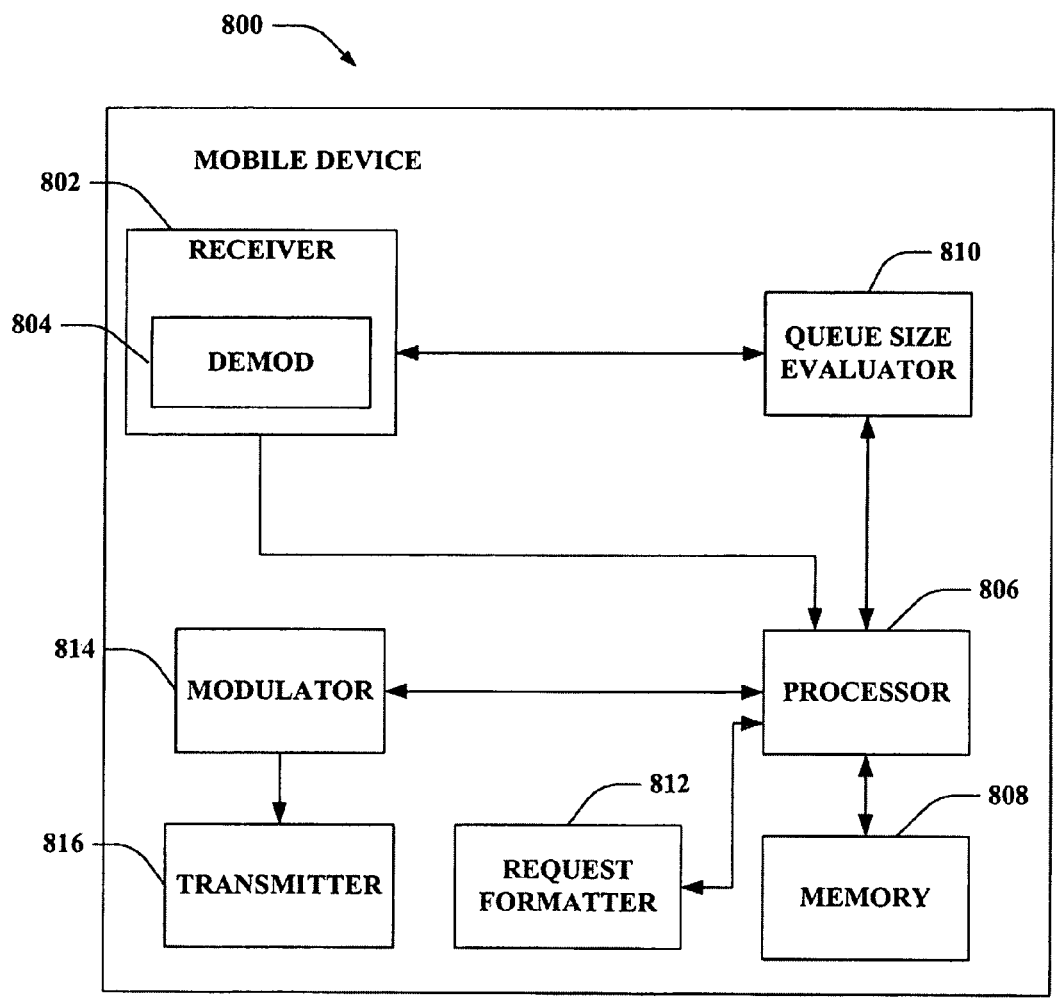
FIG. 8 is an illustration of an example system that facilitates employing uplink requests in accordance with an aspect of the subject disclosure.

FIG. 8 is an illustration of a mobile device 800 that facilitates employing uplink requests in accordance with an aspect of the subject disclosure. Mobile device 800 comprises a receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.). Further, memory 808 can retain prioritized bit rates, maximum bit rates, queue sizes, etc., related to one or more bearers serviced by the mobile device 800.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 can be operatively coupled to a queue size evaluator 810 that determines a high priority queue size and a total queue size for the mobile device 800. The queue size evaluator 810 ascertains the queue sizes based upon prioritized bit rates and maximum bit rates assigned to each radio bearer by radio resource control protocols. The queue size evaluator 810 can employ one of a plurality of mechanisms to determine queue sizes, as described supra, for instance.

Processor 806 can further be coupled to a request formatter 812 that generates an uplink request packets that includes the queue sizes determined by the queue size evaluator 810. The generated packet can be transmitted to an access point or base station. Mobile device 800 still further comprises a modulator 814 and transmitter 816 that respectively modulate and transmit signals to, for instance, a base station, another mobile device, etc. Although depicted as being separate from the processor 806, it is to be appreciated that the queue size evaluator 810, request formatter 812, demodulator 804, and/or modulator 814 can be part of the processor 806 or multiple processors (not shown).

Figure 9:
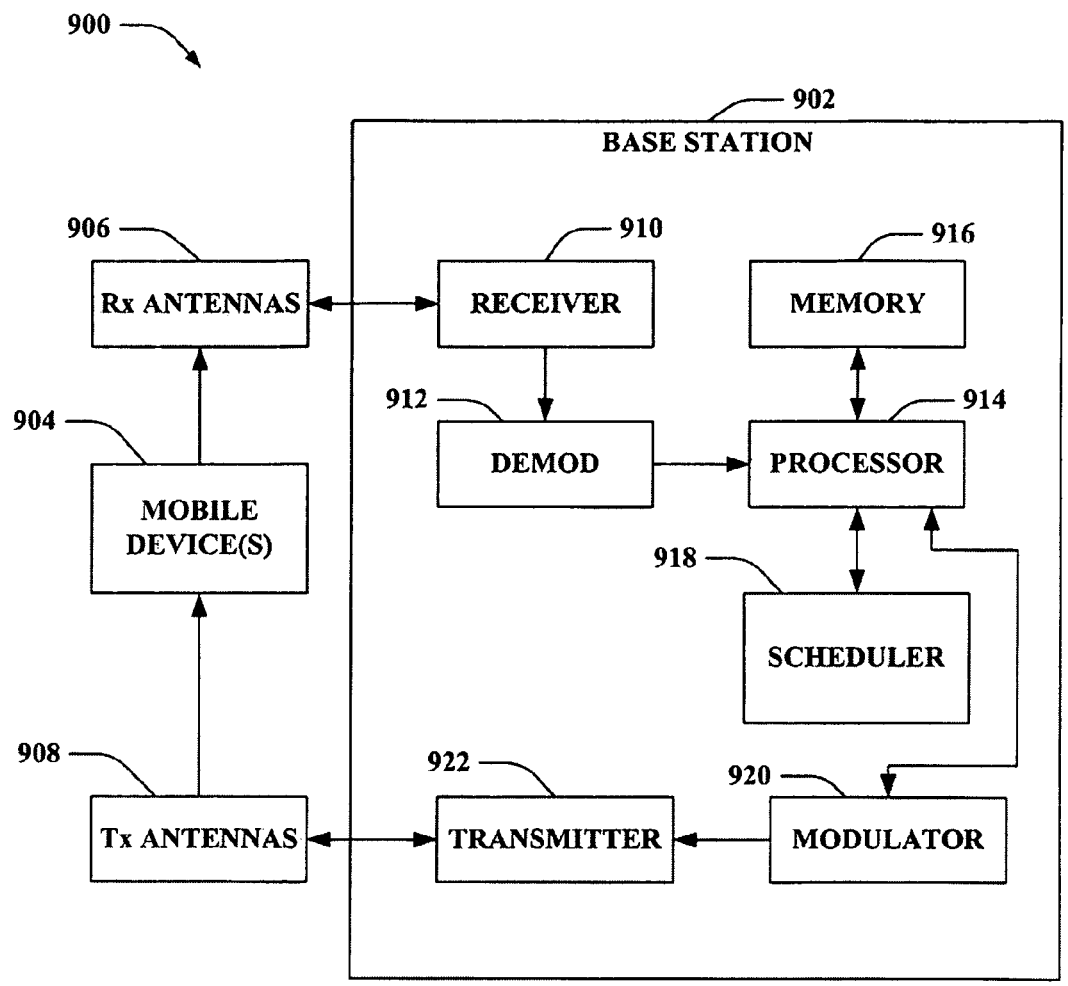
FIG. 9 is an illustration of an example system that facilitates utilizing an uplink request format that accounts for bit rates in a wireless communications system.

FIG. 9 is an illustration of a system 900 that facilitates utilizing an uplink request format that accounts for bit rates in a wireless communications system. The system 900 comprises a base station 902 (e.g., access point, . . . ) with a receiver 910 that receives signal(s) from one or more mobile devices 904 through a plurality of receive antennas 906, and a transmitter 922 that transmits to the one or more mobile devices 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein.

Processor 914 can be a processor dedicated to analyzing information received by receiver 910 and/or generating information for transmission by a transmitter 922, a processor that controls one or more components of base station 902, and/or a processor that both analyzes information received by receiver 910, generates information for transmission by transmitter 922, and controls one or more components of base station 902.

Base station 902 can additionally comprise memory 916 that is operatively coupled to processor 914 and that can store data to be transmitted, received data, information related to available channels, data associated with analyzed signal and/or interference strength, information related to an assigned channel, power, rate, or the like, and any other suitable information for estimating a channel and communicating via the channel. Memory 916 can additionally store protocols and/or algorithms associated with estimating and/or utilizing a channel (e.g. performance based, capacity based, etc.).

It will be appreciated that the memory 916 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Processor 914 is further coupled to a scheduler 918. The scheduler 918 assigns uplink resources to the mobile devices 904 based at least in part on queue sizes reported in uplink requests. Furthermore, although depicted as being separate from the processor 914, it is to be appreciated that the scheduler, demodulator 912, and/or modulator 920 can be part of the processor 914 or multiple processors (not shown).

Figure 10:
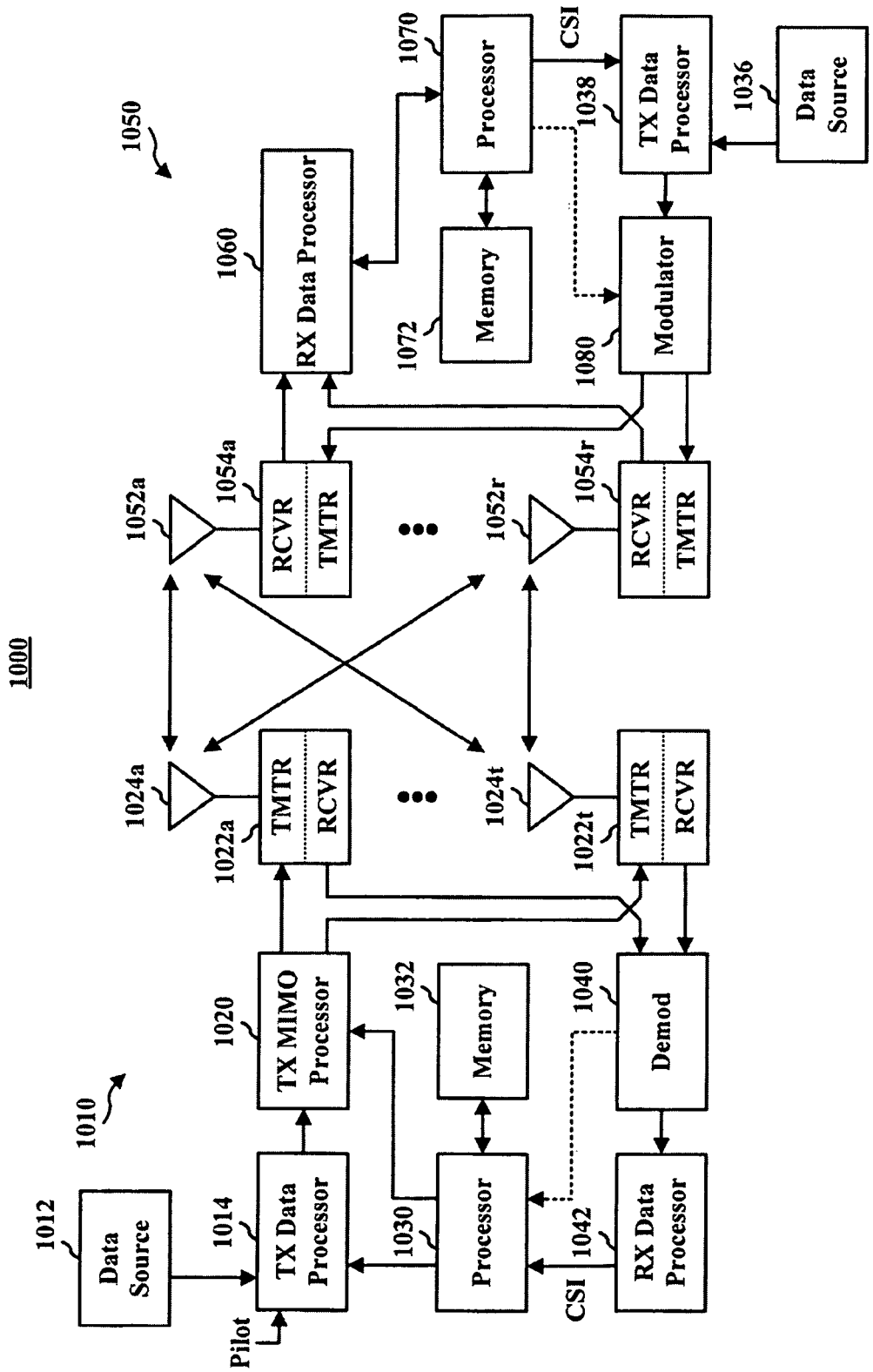
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-3 and 8-9), examples (FIGS. 4 and 5) and/or methods (FIGS. 6-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which precoding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
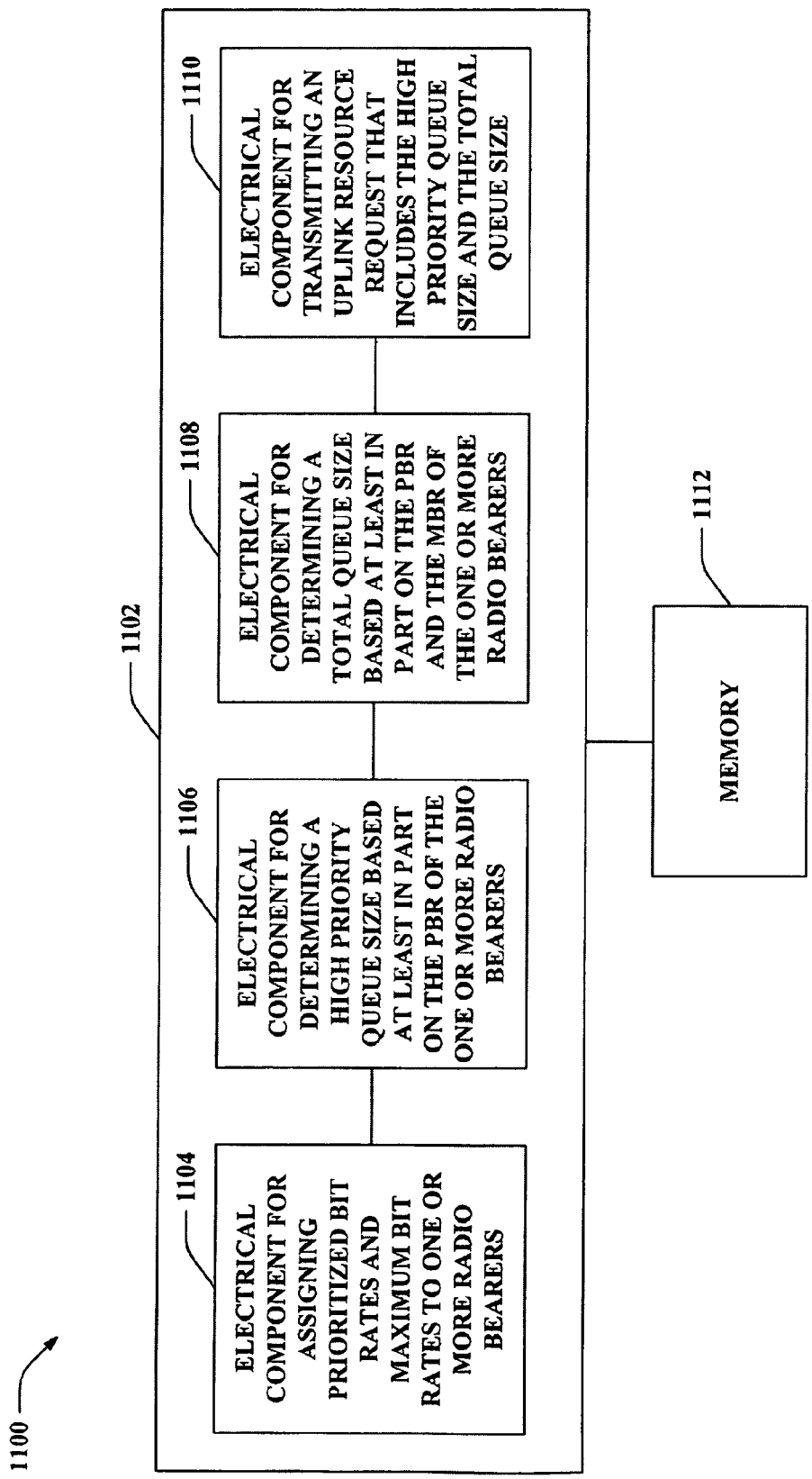
FIG. 11 is an illustration of an example system that employs prioritized bit rate values and maximum bit rate values in determining queue sizes included in resource requests.

With reference to FIG. 11, illustrated is a system 1100 that facilitates employing prioritized bit rate values and maximum bit rate values in determining queue sizes included in resource requests. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for assigning prioritized bit rates and maximum bit rates to one or more radio bearers 1104. Further, logical grouping 1102 can comprise an electrical component for determining a high priority queue size based at least in part on the prioritized bit rates of the one or more radio bearers 1106. Moreover, logical grouping 1102 can comprise an electrical component determining a total queue size based at least in part on the prioritized bit rates and the maximum bit rates of the one or more radio bearers 1108. In addition, logical grouping 1102 can include an electrical component for transmitting an uplink resource request that includes the high priority queue size and the total queue size 1110. Additionally, system 1100 can include a memory 1112 that retains instructions for executing functions associated with electrical components 1104, 1106, 1108 and 1110. While shown as being external to memory 1112, it is to be understood that one or more of electrical components 1104, 1106, 1108 and 1110 can exist within memory 1112.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates uplink rate control in a wireless communications system, comprising:
   assigning prioritized bit rates and maximum bit rates to one or more radio bearers serviced by a user equipment;
   assigning priorities to each of the one or more radio bearers;
   determining a high priority queue size based at least in part on the prioritized bit rates of the one or more radio bearers;
   determining a total queue size based at least in part on the prioritized bit rates and the maximum bit rates of the one or more radio bearers; and
   transmitting an uplink resource request that includes the high priority queue size and the total queue size.

2. The method of claim 1, wherein the priorities of each of the one or more radio bearers are assigned based upon an amount of high priority data.

3. The method of claim 1, determining the high priority queue size is further based upon a maximum bit rate of a highest priority bearer.

4. The method of claim 1, wherein the high priority queue size is based upon the prioritized bit rate of a highest priority bearer.

5. The method of claim 1, determining the high priority queue size is accomplished by summing total queue sizes across all bearers, wherein the total queue sizes are limited by prioritized bit rate bucket depths of each bearer.

6. The method of claim 1, determining the total queue size is accomplished by summing total queue sizes across all bearers, wherein the total queue sizes are limited by prioritized bit rate bucket depths and maximum bit rate bucket depths of each bearer.

7. The method of claim 1, wherein format of the uplink resource request includes at least a MAC header, the high priority queue size and the total queue size.

8. The method of claim 1, wherein format of the uplink resource request includes at least a power headroom field, a channel identifier of a highest priority channel, the high priority queue size and the total queue size.

9. The method of claim 1, wherein format of the uplink resource request includes at least a power headroom field, a delay deadline, the high priority queue size and the total queue size.

10. The method of claim 1, further comprising employing a token bucket mechanism to enforce prioritized bit rates and maximum bit rates.

11. A wireless communications apparatus, comprising:
a memory that retains instructions for:
assigning prioritized bit rates and maximum bit rates to one or more radio bearers serviced by a user equipment;
assigning priorities to each of the one or more radio bearers;
determining a high priority queue size based at least in part on the prioritized bit rates of the one or more radio bearers;
determining a total queue size based at least in part on the prioritized bit rates and the maximum bit rates of the one or more radio bearers; and
transmitting an uplink resource request that includes the high priority queue size and the total queue size; and
a processor, coupled to the memory, configured to execute the instructions retained in the memory.

12. The wireless communications apparatus of claim 11, the memory further retains instructions for determining the high priority queue size via summing total queue sizes across all bearers, wherein the total queue sizes are limited by prioritized bit rate bucket depths of each bearer.

13. The wireless communications apparatus of claim 11, the memory further retains instructions for determining the total queue size via summing total queue sizes across all bearers, wherein the total queue sizes are limited by prioritized bit rate bucket depths and maximum bit rate bucket depths of each bearer.

14. The wireless communications apparatus of claim 11, the memory further retains instructions for employing a token bucket mechanism to enforce prioritized bit rates and maximum bit rates.

15. A wireless communications apparatus that facilitates uplink rate control in a wireless communications system, comprising:
means for assigning prioritized bit rates and maximum bit rates to one or more radio bearers serviced by a user equipment;
means for assigning priorities to each of the one or more radio bearers;
means for determining a high priority queue size based at least in part on the prioritized bit rates of the one or more radio bearers;
means for determining a total queue size based at least in part on the prioritized bit rates and the maximum bit rates of the one or more radio bearers; and
means for transmitting an uplink resource request that includes the high priority queue size and the total queue size.

16. The wireless communications apparatus of claim 15, wherein the priorities of each of the one or more radio bearers are assigned based upon amount of high priority data.

17. The wireless communications apparatus of claim 15, the means for determining the high priority queue size further considers a maximum bit rate of a highest priority bearer.

18. The wireless communications apparatus of claim 15, wherein the high priority queue size is based upon the prioritized bit rate of a highest priority bearer.

19. The wireless communications apparatus of claim 15, the means for determining the high priority queue size comprises means for summing total queue sizes across all bearers, wherein the total queue sizes are limited by prioritized bit rate bucket depths of each bearer.

20. The wireless communications apparatus of claim 15, the means for determining the total queue size comprises means for summing total queue sizes across all bearers, wherein the total queue sizes are limited by prioritized bit rate bucket depths and maximum bit rate bucket depths of each bearer.

21. The wireless communications apparatus of claim 15, wherein format of the uplink resource request includes at least a MAC header, the high priority queue size and the total queue size.

22. The wireless communications apparatus of claim 15, wherein format of the uplink resource request includes at least a power headroom field, a channel identifier of a highest priority channel, the high priority queue size and the total queue size.

23. The wireless communications apparatus of claim 15, wherein format of the uplink resource request includes at least a power headroom field, a delay deadline, the high priority queue size and the total queue size.

24. The wireless communications apparatus of claim 15, further comprising means for employing a token bucket mechanism to enforce prioritized bit rates and maximum bit rates.

25. A computer program product stored on a non-transitory computer-readable medium, comprising code for:
assigning prioritized bit rates and maximum bit rates to one or more radio bearers serviced by a user equipment;
assigning priorities to each of the one or more radio bearers;
determining a high priority queue size based at least in part on the prioritized bit rates of the one or more radio bearers;
determining a total queue size based at least in part on the prioritized bit rates and the maximum bit rates of the one or more radio bearers; and
transmitting an uplink resource request that includes the high priority queue size and the total queue size.

26. The computer program product of claim 25, wherein determining the high priority queue size comprises summing total queue sizes across all bearers, wherein the total queue sizes are limited by prioritized bit rate bucket depths of each bearer.

27. The computer program product of claim 25, wherien determining the total queue size comprises summing total queue sizes across all bearers, wherein the total queue sizes are limited by prioritized bit rate bucket depths and maximum bit rate bucket depths of each bearer.

28. The computer program product of claim 25, further comprising code for employing a token bucket mechanism to enforce prioritized bit rates and maximum bit rates.

29. In a wireless communications system, an apparatus comprising:
   a processor configured to:
      assign prioritized bit rates and maximum bit rates to one or more radio bearers serviced by a user equipment;
      assign priorities to each of the one or more radio bearers;
      determine a high priority queue size based at least in part on the prioritized bit rates of the one or more radio bearers;
      determine a total queue size based at least in part on the prioritized bit rates and the maximum bit rates of the one or more radio bearers; and
      transmit an uplink resource request that includes the high priority queue size and the total queue size.

\* \* \* \* \*